United States Patent [19]

Carruth et al.

[11] Patent Number: 5,173,977
[45] Date of Patent: Dec. 29, 1992

[54] LOAD CELL MOUNT FOR HOSPITAL WEIGH BED

[75] Inventors: W. Layne Carruth, Cordova, Tenn.; Sohrab Soltani, Charleston, S.C.; Warren P. Jones, Memphis, Tenn.

[73] Assignee: Hill-Rom Company, Inc., Batesville, Ind.

[21] Appl. No.: 770,908

[22] Filed: Oct. 4, 1991

[51] Int. Cl.⁵ .............................................. A61G 7/00
[52] U.S. Cl. ........................................... 5/600; 5/912; 177/144
[58] Field of Search ............................ 5/60, 453, 508; 177/144, 229, DIG. 9

[56] References Cited

U.S. PATENT DOCUMENTS

| | | | |
|---|---|---|---|
| 4,411,327 | 10/1983 | Lockery et al. | 177/DIG. 9 |
| 4,526,246 | 7/1985 | Patoray | 177/179 |
| 4,600,066 | 7/1986 | Griffen et al. | 177/129 X |
| 4,672,699 | 6/1987 | Goodwin | . |
| 4,776,050 | 10/1988 | Goodwin | 5/453 |
| 4,793,428 | 12/1988 | Swersey | 5/508 X |
| 4,926,951 | 5/1990 | Carruth et al. | 177/144 |
| 4,974,692 | 12/1990 | Carruth et al. | . |

OTHER PUBLICATIONS

Brochure Page, FS-1, Floor Scales, Survivor HP Series Rice Lake Weighing Systems.

Primary Examiner—Michael F. Trettel
Attorney, Agent, or Firm—Wood, Herron & Evans

[57] ABSTRACT

A heavy patient support is mounted on a base by load cell beams forming the transducer for a scale to weigh a patient. Each load cell has a cup, a ball and an inverted cup providing the sole support for the patient support. Thus, only vertical components of force are weighed, and lateral movement of the patient support with respect to the bed is minimized.

4 Claims, 2 Drawing Sheets

LOAD CELL MOUNT FOR HOSPITAL WEIGH BED

BRIEF SUMMARY OF THE INVENTION

This invention relates to a weigh bed and is particularly related to a fluidized patient support system weighing of the order of 1,500 pounds. The fluidized patient support system is disclosed in U.S. Pat. No. 4,672,699 whose disclosure is incorporated herein to form a part of this disclosure. The patient support system includes a tub filled with a mass of granular material and covered with a loose-fitting flexible patient contact sheet. Air is forced into the granular material to fluidize it, thus supporting the patient on a fluidized system. The tub, the granular materials and patient weigh in excess of 1,000 pounds usually in the range of 1200–1600 pounds. The tub is mounted on a base which is trapezoidal in cross section.

An objective of the present invention has been to provide a scale for continuously weighing the patient, the scale including a transducer formed by load cell beams generally of the type disclosed in U.S. Pat. No. 4,974,692 whose disclosure is incorporated herein.

In the '692 patent, a patient support structure is mounted on a base by means of four load cells, one mounted at each corner of the bed. Each load cell has a load cell beam that is cantilever-mounted at one end and engages a steel ball at the other end. The steel ball is engaged by upper and lower flat seats that provide a rolling contact between the ball and the seats. The ball and flat seat combination provides assurance that only vertical components of force are imposed on the load cell and hence measured by the scale. A system of rods connected between the base of the bed and the patient support prevents the patient support structure from rolling off the balls.

A further objective of the present invention has been to provide an improvement on the rolling ball support of the '692 patent.

The objectives of the present invention are attained by substituting for the flat seats of the '692 patent cup-shaped upper and lower surfaces. The cup-shaped upper and lower surfaces are generally hemispherical and of a substantially greater diameter than the ball captured between the surfaces. Any tendency of the patient support to move in a lateral direction is therefore resisted by the ball having to roll uphill, so to speak, with respect to the cup-shaped seats which confine it. The heavier the load, that is the patient support, the harder it is to ride uphill to dislodge the cups from the steel ball disposed between them.

The combination of cups and steel ball connecting the load cells to the heavy patient support assures that only vertical forces will be measured by the load cells and will confine the patient support against lateral movement with respect to its base.

Another feature of the invention has been to provide retainers cooperating with bolts depending from the patient support tub, the retainers providing further assurance that lateral movement of the tub with respect to the base will be resisted.

Further, the bolts themselves pass through holes in the base to provide added insurance against lateral movement. The bolts are maintained out of contact with the retainers or the base itself in normal operation so that there is no frictional force between tub and base that would influence the weighing of the patient.

As another feature of the invention, the base has two trapezoidal structures each having a top horizontal bar. Each horizontal bar has a trough formed in its upper surface within which each load cell beam is disposed, there being four load cell beams, one at each corner of the bed.

BRIEF DESCRIPTION OF THE DRAWINGS

The several features and objectives of the present invention will become more readily apparent from the following detailed description taken in conjunction with the accompanying drawings in which.

DETAILED DESCRIPTION OF THE INVENTION

Figure 1:
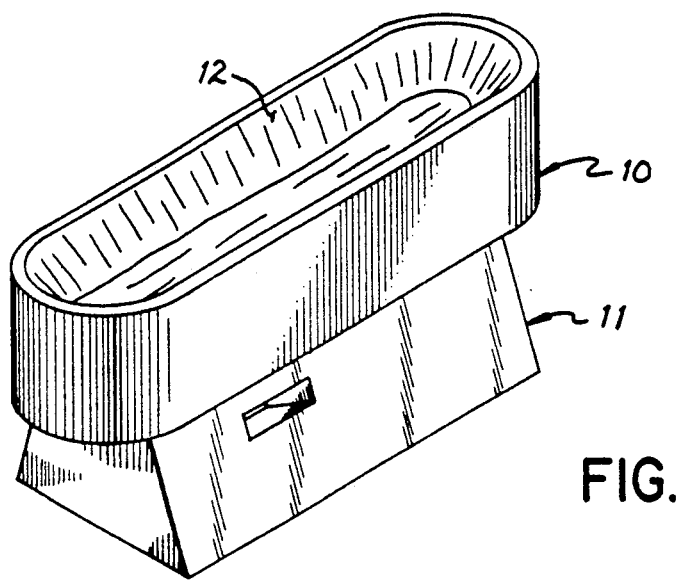
FIG. 1 is a perspective view of the invention.
Figure 3:
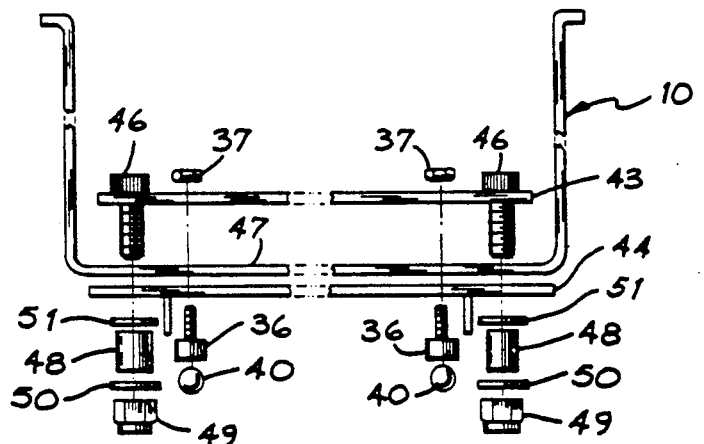
FIG. 3 is a disassembled cross-sectional view through one end of the bed.

Referring to FIG. 1, a fluidized patient support system is shown. A deep tub 10 is mounted on base 11, the base being trapezoidal in cross-section. The tub 10 is filled with a ceramic granular material which is covered by a flexible sheet 12. A blower system (not shown) drives air through the granular material in the tub creating a fluidized bed which supports the patient while resting on the sheet 12. The blower is connected to the bed by a hose of sufficient flexibility that it does not add a force component to the weighing system. The bed is particularly useful for patients who have been immobilized for long periods of time and have developed bed sores.

Figure 2:
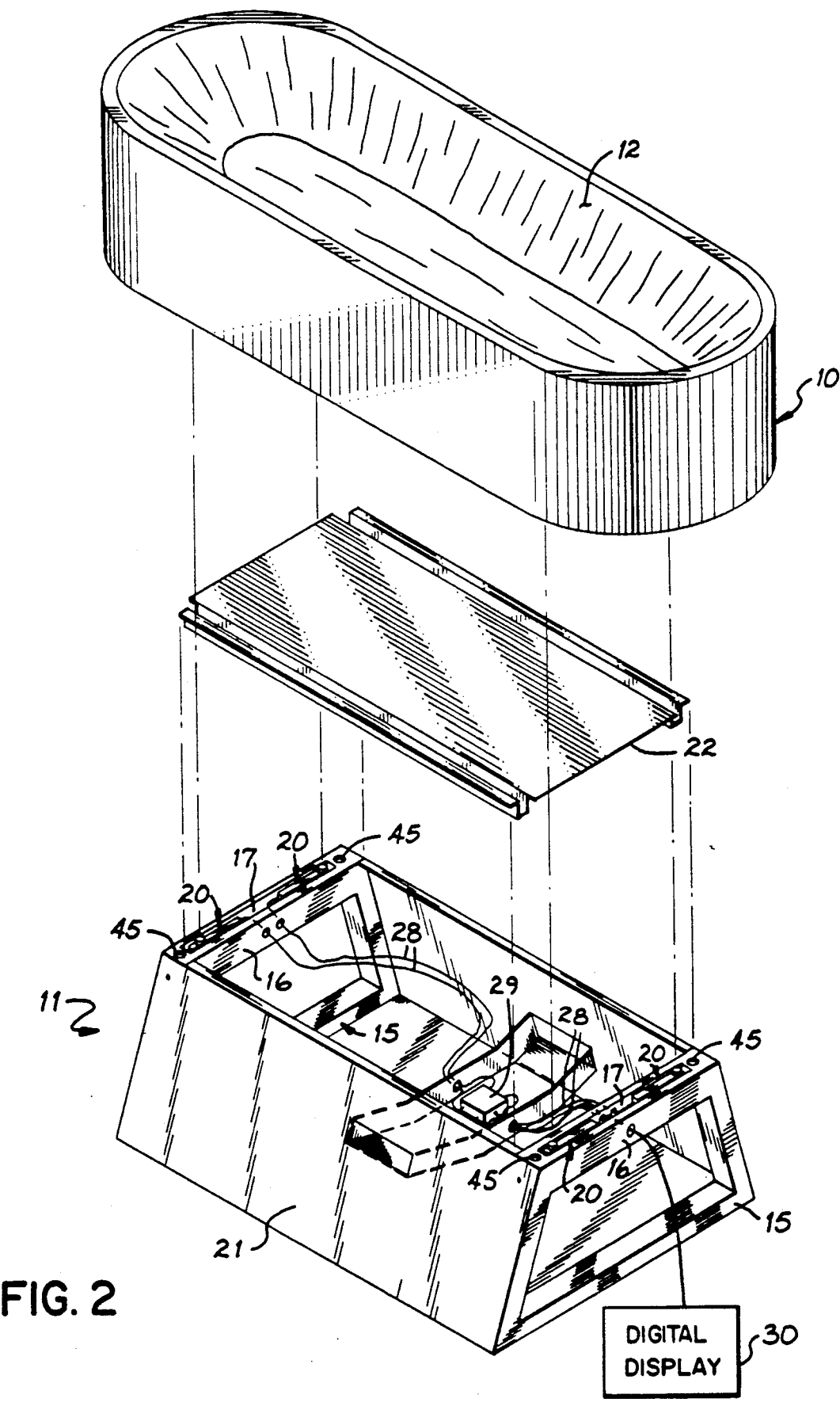
FIG. 2 is a diagrammatic, disassembled perspective view of the invention.

As shown in FIG. 2, the base 11 has as principal structural elements two horizontally-spaced trapezoidal structures 15. Each trapezoidal structure includes a top bar 16. The upper surface of the top bar 16 is formed as a trough 17 within which four load cells 20 are mounted, one load cell being at each corner of the bed. A wrapper 21 is wrapped around the sides and bottom of the base 11 to enclose the base. A stiffener plate 22 extends between the two trapezoidal structures 15 and is bolted at its ends to the trapezoidal structures while leaving the troughs 17 exposed.

Figure 4:
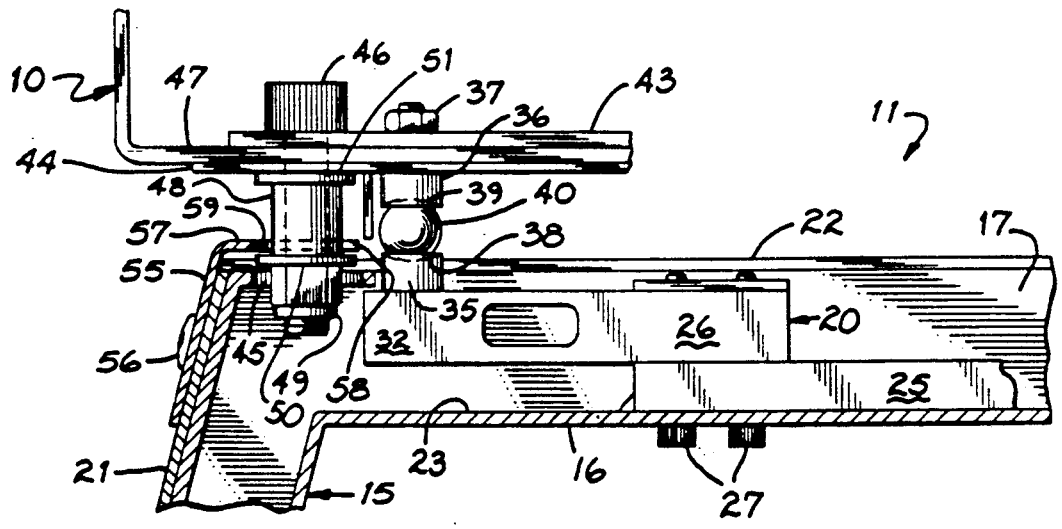
FIG. 4 is an enlarged cross-sectional view showing the load cell mount.

Referring to FIG. 4, each trough has a bottom wall 23. A spacer 25 is welded to the bottom wall 23. Each load cell 20 has a beam 26 secured by two anchor bolts 27 passing through the bottom wall 23 and spacer 25. Each load cell has a bridge connection of four strain gauges, not shown, forming a transducer connected by conductors 28 (FIG. 2) which are in turn connected to a load cell summing junction box 29 and from there to a digital display 30.

The anchor bolts 27 secure one end of the load cell beam 26 in the trough leaving a cantilevered free end 32 free to flex vertically. A lower ball cup stud 35 is threaded into the free end 32 of the load cell 20. A similar ball cup stud 36 is secured by a nut 37 to the bottom of the tub and precisely overlies the ball cup stud 35. The ball cup studs have facing surfaces 38 in the lower stud and 39 in the upper stud which are generally hemispherical. A 5/8 inch hardened stainless steel ball 40 is mounted between the surfaces 38, 39 to provide the sole connection of the tub to the load cell and base.

Collectively, the four load cells provide the entire support of the tub through the hardened balls 40. The diameter of the sphere that defines the surfaces 38, 39 is approximately ⅛ inch. The surfaces are hardened to about a Rockwell 62.

A clearance hole 45 is formed in the top bar 16 of the trapezoidal structure 15. A stop bolt 46 passes through a clamp plate 43, the bottom wall 47 of the tub 10 and a tub plate 44. A cylindrical spacer 48 is mounted on the bolt 46 below the tub and is secured thereto by a nut 49 and washers 50 and 51. The nut 49 passes through the clearance hole 45 in the top bar 16. The clearance hole 45 is of a diameter substantially greater than the transverse dimension of the nut 49 so that there is no contact between the nut or any part of the bolt 46 and the elements attached to it and the base 11.

A retainer clip 55 is attached by a bolt 56 to the side of the trapezoidal structure 15 at each corner of the base. The retainer clip has a horizontal section 57 that terminates in an edge 58 having a semicircular recess 59 of greater diameter than the spacer 48. The spacer 48 is received in the recess 59, but the dimension of the recess is greater than the diameter of the spacer so that normally there is no contact between the retainer clip and the spacer.

The retainer clip cooperating with the bolt as well as the clearance hole 45 cooperating with the nut 49 provide assurance that there will be no lateral movement of the tub great enough to cause the ball cup studs to become dislodged from the balls.

In the operation of the invention, the tub is supported only by the engagement of the studs 35, 36 with the ball 40 at each corner of the tub. The weight of the tub and patient stresses the load cell beams causing their transducers to provide signals proportional to the weight that is stressing them. The weight of the patient is displayed on the digital display 30. Each ball 40 provides single point contact with its upper and lower cup stud 36, 35 so that only vertical components of force are applied to the load cell beam. Any tendency of the tub to move laterally with respect to the base is resisted by the cup stud and ball interconnection. The upper stud must roll uphill over the ball to be dislodged and/or the ball must roll uphill over the lower stud to be dislodged. The greater the mass contained within the tub, the greater is the lateral force that would be required to cause the dislodgment of the cup and ball interengagement. Thus, under normal conditions of transportation and the like, the tub remains securely seated on the base. If there is unusual lateral stress of the tub with respect to the base, that is resisted by the bolt 46 and its engagement with clearance hole 45 and/or clip 55.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:
1. A weigh bed comprising:
   a base including two spaced trapezoidal structures each having a top bar,
   a load cell beam mounted at each end of each said top bar having a first end fixed to said top bar and a second end free to flex vertically,
   a lower partial hemispherical cup of large diameter on the free end of said beam,
   a ball of small diameter in said cup,
   an upper partial hemispherical cup of large diameter engaging the upper side of said ball,
   and a patient support structure mounted on and supported by each said upper ball,
   whereby said patient support structure is impeded from moving laterally off said base by the requirement of said ball and cup riding uphill out of engagement.
2. A weigh bed as in claim 1 further comprising:
   four bolts,
   one said bolt projecting downwardly from each of four corners of said patient support structure,
   a retainer plate at each corner of said base and having a first side fixed to the side of said trapezoidal structure and a second side overlying the end of said bar,
   said second side having a recess in its edge which receives said bolt without contact therewith to limit its movement in lateral directions,
   whereby said four bolts and four retainers collectively limit lateral movement of patient support structure with respect to said base.
3. A weigh bed as in claim 2 in which each said bar forming the top of said trapezoidal structure has a hole to receive each said bolt, each said hole having a larger diameter than its respective bolt, thereby preventing any frictional contact between bolt and bar during normal operation.
4. A weigh bed as in claim 1 further comprising:
   a trough extending across the top bar of each said trapezoid,
   each load cell beam being disposed in said trough.

* * * * *

UNITED STATES PATENT AND TRADEMARK OFFICE
CERTIFICATE OF CORRECTION

PATENT NO. : 5,173,977
DATED : December 29, 1992
INVENTOR(S) : W. Layne Carruth, Sohrab Soltani and Warren P. Jon It is certified that error appears in the above-identified patent and that said Letters Patent is hereby corrected as shown below: On the title page: Item

[73] Assignee:, change "Hill-Rom Company, Inc." to

-- SSI Medical Services, Inc. --.

Signed and Sealed this

Twenty-first Day of November, 199!

Attest:

BRUCE LEHMAN

Attesting Officer    Commissioner of Patents and Trademarks